US 11,727,477 B1

(12) United States Patent
Gore et al.

(10) Patent No.: US 11,727,477 B1
(45) Date of Patent: *Aug. 15, 2023

(54) VIRTUAL REALITY VISUALIZATION SYSTEM WITH OBJECT RECOMMENDATION ENGINE

(71) Applicant: Allstate Insurance Company, Northbrook, IL (US)

(72) Inventors: Caleb Brian Slaughter Gore, Buffalo Grove, IL (US); Colton J. Reif, Winfield, IL (US)

(73) Assignee: Allstate Insurance Company, Northbrook, IL (US)

( * ) Notice: Subject to any disclaimer, the term of this patent is extended or adjusted under 35 U.S.C. 154(b) by 102 days.

This patent is subject to a terminal disclaimer.

(21) Appl. No.: 17/329,342

(22) Filed: May 25, 2021

Related U.S. Application Data (63) Continuation of application No. 16/253,725, filed on Jan. 22, 2019, now Pat. No. 11,023,961, which is a (Continued)

(51) Int. Cl.
*G06Q 30/06* (2023.01)
*G06Q 30/0601* (2023.01)
(Continued)

(52) U.S. Cl.
CPC ....... *G06Q 30/0643* (2013.01); *G06F 3/0482* (2013.01); *G06F 3/04815* (2013.01); *G06Q 30/0631* (2013.01); *G06Q 40/08* (2013.01); *G06T 19/006* (2013.01); *G06T 19/20* (2013.01); *G06T 2210/04* (2013.01)

(58) Field of Classification Search
CPC ....... G06T 19/00; G06T 19/006; G06T 19/20; G06T 2210/04; G06T 2210/00; G06Q 30/06; G06Q 30/0601–0643; G06Q 30/08; G06Q 40/08; G06Q 30/0278; G06Q 30/0283; G06Q 30/015–016
See application file for complete search history.

(56) References Cited

U.S. PATENT DOCUMENTS 8,490,006 B1   7/2013   Reeser et al.
8,527,306 B1   9/2013   Reeser et al.
(Continued)

OTHER PUBLICATIONS http://www.lowes.com/cd_virtual+room+designer_1 89310537_.
(Continued)

*Primary Examiner* — William J Allen
(74) *Attorney, Agent, or Firm* — Foley & Lardner LLP (57) ABSTRACT

Aspects of the disclosure relate to virtual reality systems (and/or augmented reality systems) that facilitate visualization of replacement and/or additional items for rebuilding a damaged room. The system may provide a virtual representation of a subject real world room. A user may select items, such as appliances and furniture, for placement in the virtual room and the system may update the virtual room to include a representation of the items. In some embodiments, the system may utilize information about the user to provide recommendations regarding items that may be placed in a virtual room. For example, the system may utilize one or more service records to identify items covered under a service associated with the user. In some embodiments, the system may apply a monetary settlement to the cost of the real world items to facilitate the replacement of damaged items.

20 Claims, 6 Drawing Sheets

Related U.S. Application Data continuation of application No. 15/012,291, filed on Feb. 1, 2016, now Pat. No. 10,223,740.

(51) Int. Cl.

| | | |
|---|---|---|
| *G06F 3/04815* | (2022.01) | |
| *G06F 3/0482* | (2013.01) | |
| *G06T 19/00* | (2011.01) | |
| *G06T 19/20* | (2011.01) | |
| *G06Q 40/08* | (2012.01) | |

(56) References Cited

U.S. PATENT DOCUMENTS

| 8,533,144 | B1 | 9/2013 | Reeser et al. |
|---|---|---|---|
| 10,475,103 | B2 | 11/2019 | Hiranandani et al. |
| 10,573,019 | B1 | 2/2020 | Anadure et al. |
| 2001/0051883 | A1 | 12/2001 | Loveland |
| 2002/0010655 | A1 | 1/2002 | Kjallstrom |
| 2002/0116228 | A1 | 8/2002 | Bauer et al. |
| 2008/0103913 | A1 | 5/2008 | Leach et al. |
| 2010/0179837 | A1 | 7/2010 | Winger |
| 2012/0239581 | A1 | 9/2012 | Mosher |
| 2013/0050511 | A1 | 2/2013 | Derby et al. |
| 2013/0222393 | A1 | 8/2013 | Merrell et al. |
| 2014/0142989 | A1 | 5/2014 | Grosso |
| 2014/0257876 | A1 | 9/2014 | English et al. |
| 2014/0285522 | A1 | 9/2014 | Kim et al. |
| 2014/0288976 | A1 | 9/2014 | Thomas et al. |
| 2015/0170260 | A1 | 6/2015 | Lees et al. |

OTHER PUBLICATIONS http://www.stuffsafe.com/faq.
https://itunes.apple.com/us/app/mystuff2-home-inventory-database/id354735594?mt=8.
https://play.google.com/store/apps/details?id=com.encircle&hl=en.
https://www.knowyourstuff.org/iii/login.html.
http://www.techlicious.com/tip/creating-a-home-inventory-for-insurance/.
http://appcrawlr.com/ios-apps/best-apps-home-inventory.
Jun. 4, 2018—U.S. Non-Final Office Action—U.S. Appl. No. 15/021,291.
Oct. 2, 20182 U.S. Notice of Allowance—U.S. Appl. No. 15/012,291.
Sep. 2, 20201—U.S. Non-Final Office Action—U.S. Appl. No. 16/253,725.
Jan. 2, 20219—U.S. Notice of Allowance—U.S. Appl. No. 16/253,725.
Rieland, "How Augmented Reality Will Change How You Buy Furniture," Smithsonian Magazine, 3 pages (2016).

VIRTUAL REALITY VISUALIZATION SYSTEM WITH OBJECT RECOMMENDATION ENGINE

CROSS-REFERENCE TO RELATED APPLICATIONS

This application is a continuation of U.S. application Ser. No. 16/253,725 filed on Jan. 22, 2019, which is a continuation of U.S. application Ser. No. 15/012,291 filed on Feb. 1, 2016, the entirety of which is incorporated herein by reference.

TECHNICAL FIELD

Aspects of the disclosure generally relate to a virtual reality visualization system with an object recommendation engine. In particular, various aspects of the disclosure provide a virtual reality room visualization system that provides recommendations regarding room contents based on information about the user.

BACKGROUND

Virtual reality systems may provide a user with a virtual environment based on a real world environment. Virtual reality systems may provide a user interface allowing a user to interact with the virtual environment. For example, the user may manipulate electronic representations of objects in the virtual environment. Virtual reality user interfaces may be displayed on display interfaces such as user computing devices.

Some companies offer tools that generate a virtual room and allow customers to place virtual objects in the virtual room to see how they may be arranged in the virtual room. Once a customer has configured their virtual room to their liking using products sold by the store, the customer may be able to purchase the real world counterparts to the virtual objects and install them in their home.

When a home or other structure is damaged, homeowners may submit claims under homeowner's insurance policies that cover the damage. As part of these claims, homeowners may seek reimbursement or replacement of damaged items and/or appliances in the home. The homeowner may fill out a claim form listing the damaged items and an insurer may evaluate the damage against the coverage of an insurance policy. The insurer may provide reimbursement in the form of a settlement, allowing the homeowner to purchase replacement items at a local retailer.

Although existing tools may allow users to view a virtual room and place virtual objects therein, significant difficulties exist in accurately representing a real world room on a virtual reality system. Further, the user experience may suffer in instances where the system provides users an uncurated catalog of virtual objects for inclusion in the room, potentially overwhelming the user with choices. Further still, users are often unaware of the impact that the installation of new objects in a home may have on premiums associated with homeowner's insurance policies.

SUMMARY

Aspects of the disclosure relate to virtual reality systems (and/or augmented reality systems) that facilitate visualization of replacement and/or additional items for rebuilding a damaged room. The system may provide a virtual representation of a subject real world room. A user may select items, such as appliances and furniture, for placement in the virtual room and the system may update the virtual room to include a representation of the items. In some embodiments, the system may utilize information about the user to provide recommendations regarding items that may be placed in a virtual room. For example, the system may utilize one or more service records to identify items covered under a service associated with the user. In some embodiments, the system may apply a monetary settlement to the cost of the real world items to facilitate the replacement of damaged items.

A virtual reality visualization system may generate a virtual room corresponding to a real world room and cause the virtual room to be displayed on a display interface. The virtual room may be generated based on information about the real world room, such as dimensions, location, objects therein, and/or other attributes of the real world room. The system may gather visual and/or sensory information from the real world room using cameras and other sensors and determine the attributes of the room based on the gathered information. For example, the system may determine a set of dimensions for the room based on image data captured by a camera of a user device.

Insured users may submit claims for damage to objects in the room covered by a service, such as an insurance policy. Where the damage justifies replacing the object, the insurer may provide an appropriate settlement amount to the insured covering costs associated with a replacement object and/or compensating the insured for their loss. The virtual reality visualization system may receive claim information including an identification of prior objects that occupied the real world room and were subject to damage or otherwise merit replacement and an associated settlement amount.

The virtual reality visualization system may allow users to select replacement objects from a catalog of objects and present a representation of selected objects in the virtual room. According to some aspects, the system may recommend replacement objects based on the prior objects and/or based on attributes of the user and associated insurance policies. In some embodiments, the system may recommend comparable alternative objects based on attributes of the prior objects. In other embodiments, the system may select alternative objects for inclusion in a list of recommended objects based on determining an impact that object may have on a premium for an insurance policy associated with the user. The list of recommended replacement objects may be presented to the user on the display interface to facilitate selection of replacement objects for inclusion in the virtual room.

In some embodiments, the system may further facilitate the user's review and selection of replacement objects by providing an indication of an impact the object may have on an insurance policy associated with the user. According to some aspects, the system may determine a change in premium associated with a replacement object.

The virtual reality visualization system may receive user input from the user selecting one or more replacement objects, such as a recommended replacement object from the list of recommendations. The system may update the virtual room to include a virtual representation of the selected object. The user may continue selecting objects and the system may continue updating the virtual room until the user is satisfied with the state of the virtual room and the object representations therein. Thus, users may be able to virtually rebuild a room in the event of damage and may be provided with a visualization of how the real world room may look after installation of the selected replacement objects.

The system may facilitate the purchase of the replacement objects by placing an order with a third-party for the replacement objects and may apply the balance of the settlement amount towards the purchase. Replacement objects may have an associated price, and the system may dynamically update the remaining settlement amount as the user selects and/or removes replacement objects. Once the user is satisfied with the state of the virtual room and the selected replacement objects, the system may generate and transmit an order for the selected replacement objects.

The system may, in some embodiments, be implemented utilizing augmented reality techniques such as smart glasses that may project virtual objects onto a field of vision of a user. These techniques may create the appearance that the virtual objects are present in a real world room or other real world environment. The system may use augmented reality techniques to display the virtual representations of selected objects such that they appear to the user to be placed in the real world room, similarly to the virtual reality embodiments described above.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Aspects of the disclosure generally relate to virtual reality and/or augmented reality visualization systems with an object recommendation engine. In particular, various aspects of the disclosure provide a virtual reality room building system that provides recommendations regarding room contents based on information about the user.

One or more aspects described herein may provide systems, devices, and methods that provide a virtual reality (and/or augmented reality) visualization of a real world room and utilize a recommendation engine to facilitate a user's selections of objects for inclusion in the room. The system may comprise a virtual reality visualization device in communication with a display interface. The display interface may be configured to present a graphical user interface including a virtual room that corresponds to a real world room. The display interface may also display a settlement amount for purchasing replacement objects and a recommended object listing of one or more recommended objects for inclusion in the virtual room based on user information and room information maintained by the system. The virtual reality visualization device (and/or system) may comprise one or more data stores configured to store room information corresponding to the real world room, such as dimensions of the room or a listing of prior objects that are known to have previously resided in the room. The one or more data stores may also store user information corresponding to a user of the user device or a user covered by one or more insurance policies. The user information may include details related to an insurance claim made by the user and/or a settlement amount associated with the claim.

In accordance with one or more aspects described herein, the virtual reality visualization device (and/or system) may generate a virtual representation of the room, such as a virtual reality room depicting corresponding features of the real-world room in three-dimensions. The virtual room may be based on the dimensions of the real world room, objects known to have resided in the room, objects the system may recommend for the room, and/or any other suitable information about the real world room. The virtual reality visualization device may also generate a list of recommended objects for the user to select for inclusion in the virtual room and/or preselect one or more recommended objects. The virtual reality visualization device may select the recommended objects for inclusion in the list of recommended objects based at least in part on the known prior objects associated with the real world room. The virtual reality visualization device may transmit and/or otherwise cause display of the virtual representation and the list of recommended objects on the display interface.

The system may receive a selection of a recommended object included in the recommended object list from the user. The virtual room may be updated to include a representation of the selected object. In some embodiments, the user may specify a location for the selected object and/or the system may generate a recommended location for the object. The object may be placed in the virtual room at the appropriate location.

The system may provide a display of a settlement amount or credit associated with a claim submitted by the user. The settlement amount may be provided by an insurer to allow the user to replace one or more pieces of furniture, appliances, or other objects damaged as part of a covered event. The list of recommended objects may include a price associated with the recommended objects and the system may update the settlement amount to reflect the cost of objects selected for inclusion in the virtual room. The system may then cause the updated virtual room and updated settlement amount to be displayed to the user. Once the user is satisfied with the selected items, the system may facilitate the purchase of the items from suitable retailers and may apply the settlement amount towards the cost of the selected items.

Figure 1:
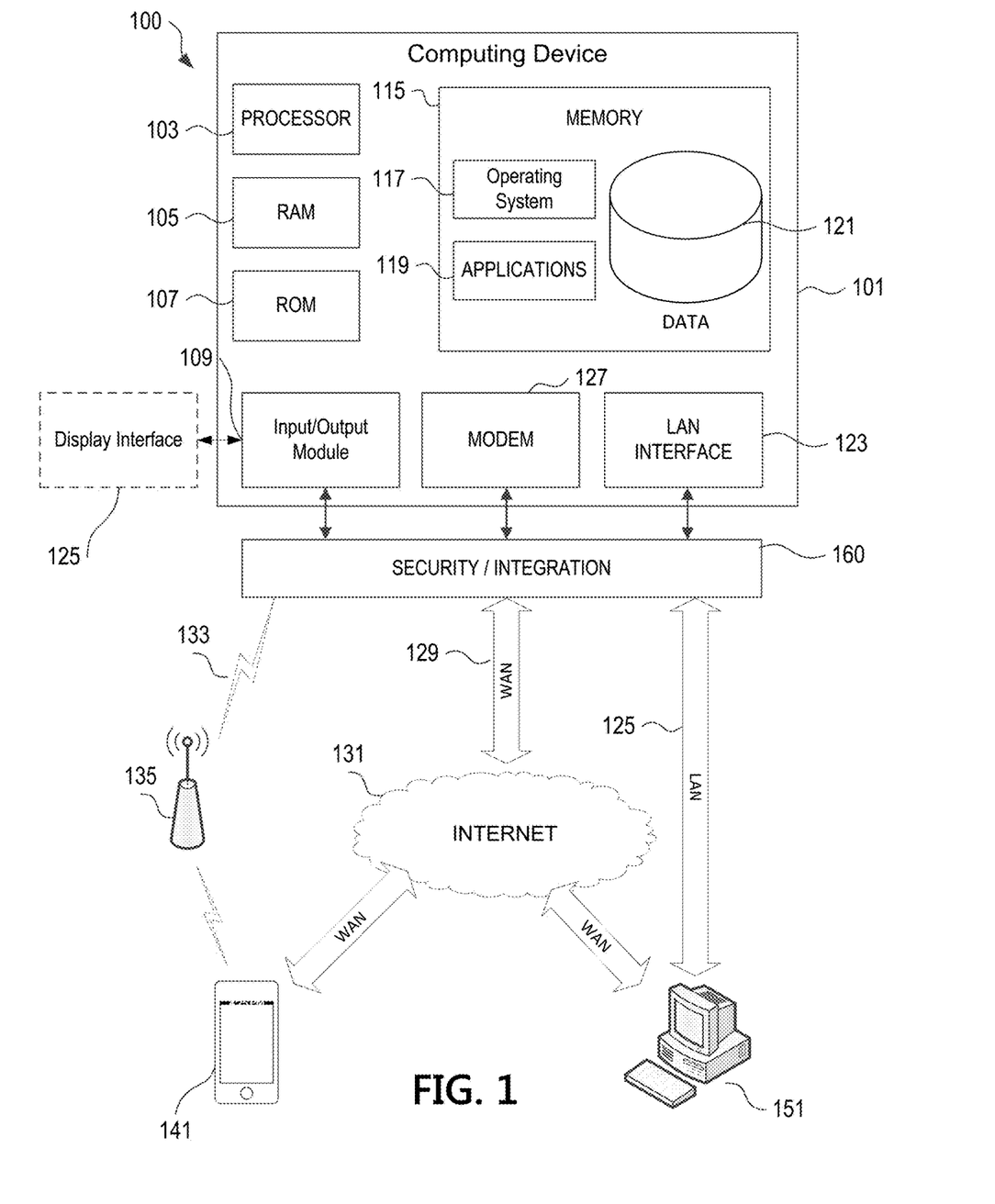
FIG. 1 provides an illustrative special purpose computing device through which various aspects of the disclosure may be implemented.

However, before discussing these and other aspects further, discussion will turn to an example virtual reality visualization device that may be used to implement one or more aspects described herein, as shown in FIG. 1.

FIG. 1 illustrates a block diagram of a virtual reality visualization device (or server) 101 in a computer system 100 (e.g., a virtual reality visualization system) that may be used according to one or more illustrative embodiments of the disclosure. The virtual reality visualization device 101 may be a specially configured computing device and may have one or more processors 103 for controlling overall operation of the virtual reality visualization device 101 and its associated components, including one or more memory units (e.g., RAM 105, ROM 107), an input/output module 109, and a memory 115. The virtual reality visualization device 101, along with one or more additional devices (e.g., terminals 141 and 151, security and integration hardware corresponding to an integration layer 160) may correspond to a virtual reality visualization system configured as described herein for generating a display of a virtual room and facilitating the selection of replacement objects.

The input/output (I/O) 109 may include one or more user interfaces, such as a microphone, keypad, touch screen, and/or stylus through which a user of the computing device 101 may provide input, and may also include one or more of a speaker for providing audio output and a video display device for providing textual, audiovisual and/or graphical output. For example, the input/output 109 may be communicatively coupled with a display interface 125. Display interface 125 may comprise any suitable display device, such as a monitor or display panel integrated into the virtual reality visualization device 101 in some embodiments. In other embodiments, display interface 125 may be associated with a user device in communication with the virtual reality visualization device 101 and operative to display the virtual room as generated by the virtual reality visualization device 101. Software may be stored within memory 115 and/or storage to provide instructions to processor 103 for enabling device 101 to perform various actions. For example, memory 115 may store software used by the device 101, such as an operating system 117, application programs 119, and an associated database 121 (such as the room information and user information databases discussed further herein). The various hardware memory units in memory 115 may include volatile and nonvolatile, removable and non-removable media implemented in any method or technology for storage of information such as computer readable instructions, data structures, program modules or other data. The memory 115 also may include one or more physical persistent memory devices and/or one or more non-persistent memory devices. The memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the processor 103.

The processor 103 may include a single central processing unit (CPU), which may be a single-core or multi-core processor (e.g., dual-core, quad-core, etc.), or may include multiple CPUs. In some cases, the processor 103 may have various bit sizes (e.g., 16-bit, 32-bit, 64-bit, 96-bit, 128-bit, etc.) and various processor speeds (ranging from 100 MHz to 5 Ghz or faster). The processor 103 and its associated components may allow the device 101 to execute a series of computer-readable instructions, for example, to generate a virtual room corresponding to a real world room and generate a list of recommended items for inclusion in the virtual room.

The virtual reality visualization device 101 (e.g., a user device, a server computer, an insurance provider computer hardware memory and processor system, an insurance clearinghouse computer memory and processor device, etc.) may operate in a networked environment (e.g., the computing system 100) supporting connections to one or more remote computers, such as terminals 141 and 151. The terminals 141 and 151 may be personal computers, servers (e.g., web servers, database servers), clients, or mobile communication devices (e.g., mobile phones, portable computing devices, and the like), and may include some or all of the elements described above with respect to the computing device 101. In some cases, the terminals 141, 151 may be located at one or more different geographic locations, including, but not limited to, at a site associated with an insurance agent and/or agency and/or a site associated with an insurance provider. The network connections depicted in FIG. 1 include a local area network (LAN) 125 and a wide area network (WAN) 129, and a wireless telecommunications network 133, but may also include other networks. When used in a LAN networking environment, the virtual reality visualization device 101 may be connected to the LAN 125 through a network interface or adapter 123. When used in a WAN networking environment, the device 101 may include a modem 127 or other means for establishing communications over the WAN 129, such as network 131 (e.g., the Internet, a cellular network, and the like). When used in a wireless telecommunications network 133, the virtual reality visualization device 101 may include one or more transceivers, digital signal processors, and additional circuitry and software for communicating with wireless computing devices 141 (e.g., mobile phones, portable customer computing devices) via one or more network devices 135 (e.g., base transceiver stations) in the wireless telecommunications network 133.

Also illustrated in FIG. 1 is a security and integration layer 160, through which communications may be sent and managed between the virtual reality visualization device 101 and the remote devices (terminals 141 and 151) and remote networks (networks 125, 129, and 133). The security and integration layer 160 may comprise one or more computing devices, such as web servers, authentication servers, and various networking components (e.g., firewalls, routers, gateways, load balancers, etc.), having some or all of the elements described above with respect to the virtual reality visualization device 101. As an example, security and integration layer 160 may comprise a set of web application servers configured to use secure protocols and to insulate the virtual reality visualization device 101 (e.g., one or more servers, a workstation, etc.) from external devices (e.g., terminals 141 and 151). In some cases, the security and integration layer 160 may correspond to a set of dedicated hardware and/or software operating at the same physical location and under the control of same entities as the virtual reality visualization device 101. For example, the integration layer 160 may correspond to one or more dedicated web servers and network hardware in a data center or in a cloud infrastructure supporting a cloud-based application and/or process. In other examples, the security and integration layer 160 may correspond to separate hardware and software components which may be operated at a separate physical location and/or by a separate entity.

In some cases, the data transferred to and from virtual reality visualization device 101 may include secure and sensitive data, such as insurance customer and policy data. Therefore, it may be desirable to protect the data transmission by using secure network protocols and encryption, and also to protect the integrity of the data stored when on the virtual reality visualization device 101 using the security and integration layer 160 to authenticate users and restrict access to unknown or unauthorized users. In various implementations, security and integration layer 160 may provide, for example, a file-based integration scheme or a service-based integration scheme. In filed-based integration, data files may be transmitted to and from the virtual reality visualization device 101 through the security and integration layer 160, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption.

In service-based integration, one or more web services may be implemented within the system 100 between the virtual reality visualization device 101 and/or security and integration layer 160. The web services may be accessed by authorized external devices and users to support input, extraction, and manipulation of the data in the virtual reality visualization device 101. Web services built to support to the system 100 may be cross-domain and/or cross-platform, and may be built for enterprise use. Such web services may be developed in accordance with various web service standards, such as the Web Service Interoperability (WS-I) guidelines. In some examples, system web services may be implemented in the security and integration layer 160 using the Secure Sockets Layer (SSL) or Transport Layer Security (TLS) protocol to provide secure connections between the virtual reality visualization device 101 and various clients (e.g., terminals 141 and 151) attempting to access, insert and/or manipulate data within the system 100. SSL or TLS may use HTTP or HTTPS to provide authentication and/or confidentiality. In some cases, system web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within the memory 115 or other components in the system 100, may include one or more caches, for example, CPU caches used by the processing unit (e.g., the processor 103), page caches used by the operating system 117, disk caches of a hard drive, and/or database caches used to cache content from the database 121. For embodiments including a CPU cache, the CPU cache may be used by one or more processors in the processing unit (e.g., the processor 103) to reduce memory latency and access time. In such examples, a processor 103 may retrieve data from or write data to the CPU cache rather than reading/writing to memory 115, which may improve the speed of these operations. In some examples, a database cache may be created in which certain data from the database 121 may be cached in one or more separate smaller databases on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of the system 100.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 119, such as a virtual reality claims processing application, may be used by the virtual reality visualization device 101 within the system 100, including computer executable instructions for generating a virtual room corresponding to a real world room, generating a list of recommended objects for inclusion in the virtual room, receiving user selections of objects for inclusion in the room, and dynamically updating a settlement amount based on the selections.

Aspects of the disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 2:
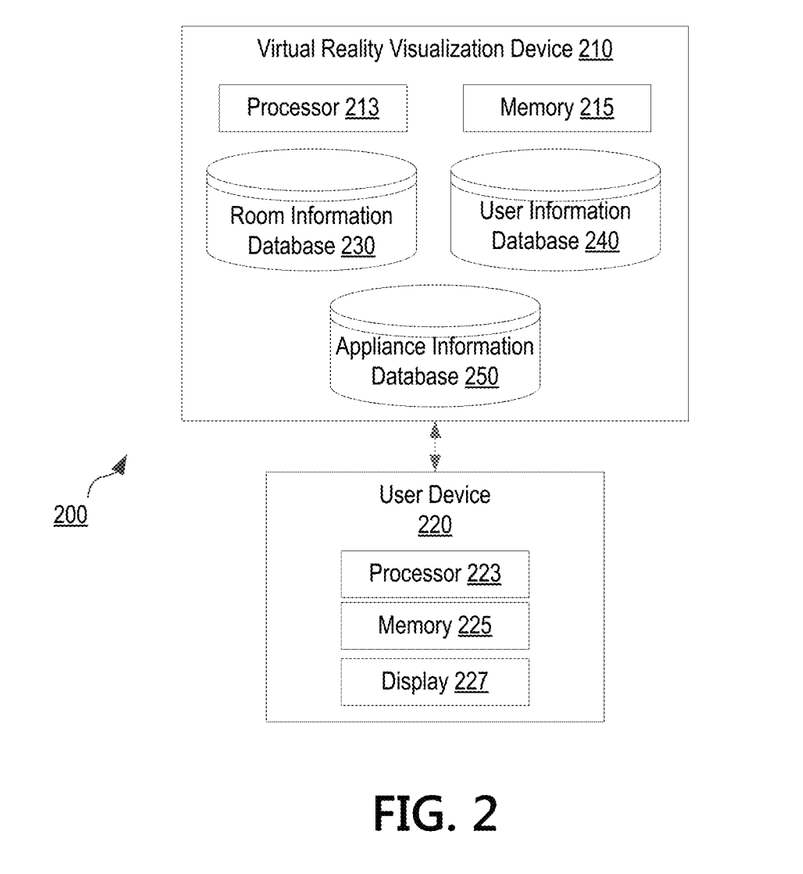
FIG. 2 provides an illustrative block diagram of a system that may be used to implement the processes and functions of certain aspects of the present disclosure.

Referring to FIG. 2, an illustrative system 200 for implementing methods for providing recommendations in a virtual room replacement application according to the present disclosure is shown. As illustrated, system 200 may include virtual reality visualization device 210, user device 220, room information database 230, user information database 240, appliance information database 250, and display interface 227. Virtual reality visualization device 210 and user device 220 may possess many of the same hardware/software components as virtual reality visualization device 101 shown in FIG. 1.

Virtual reality visualization device 210 may comprise one or more processors 213 and memory 215. As illustrated in FIG. 2, virtual reality visualization device 210 may comprise room information database 230 and user information database 240. Room information database 230 may store information about a real world room such as dimensions of the real world room and a list of objects determined to reside therein. Other features and attributes of the room may also be recorded in room information database 230, such as the position of the room within the house or dwelling, the location and number of windows and doorways, and the like. User information database 240 may store information about insured users, such as claim information, policy information, awarded settlement amounts, and other attributes associated with the user. Item information corresponding to attributes of the available objects may be stored by the system in the form of an appliance information database 250.

An appliance information database 250 may contain information about household appliances in the form of attributes for the various objects represented therein. This information may be obtained from a supported retailer that offers the specified appliance and/or from a manufacturer of the appliance. The information stored in the appliance information database 250 may include the specifications of each appliance, such as physical dimensions, power requirements, plumbing requirements, and ventilation requirements. The appliance information may also include price of each item. The price may be the best price available, or it may be the current price available through a preferred retailer. The appliance information may additionally include warranty information offered by the manufacturer and/or the retailer. The appliance information may also include safety information. The safety information may be based on past claims or recalls involving the same or similar make or model, and may relate to a risk of water damage, gas leakage, or fires, for example.

Although one particular configuration is illustrated, in other implementations one or more devices may be combined with other devices and/or divided into multiple devices. For example, some embodiments may store the room information database 230, user information database 240, and appliance information database 250 on separate devices from the virtual reality visualization device 210.

As described further herein, virtual reality visualization device 210 may be configured to retrieve a settlement amount from user information database 240. Additionally or alternatively, the device 210 may retrieve claim information from database 240 and use the retrieved claim information to determine a settlement amount. Similarly, the device 210 may retrieve information about one or more attributes of the user and/or insurance policies associated with the user from database 240. For example, user information database 240 may store a user's name, address, age, gender, marital status, income, education, and/or any other suitable attributes of the user. User information database 240 may also store insurance policy information such as scope of coverage, coverage limitations, amounts of coverage, inclusions, exclusions, premium amounts, deductibles, duration, term, coverage dates, and/or any other suitable attributes of insurance policies associated with the user.

Virtual reality visualization device 210 may be configured to generate a virtual room corresponding to a real world room. According to some aspects, the device 210 may generate the virtual room based on room information stored by room information database 230 such as dimensions, location, positions of outlets, doors and windows, and any other suitable feature that characterizes the real world room. Virtual reality visualization device 210 may also be configured to generate a recommended object list or listing based at least in part on a list of prior objects stored in room information database 230. Room information database 230 may store information about prior objects in the room such as furniture, appliances, decorations, fixtures, floor and wall coverings, textures, and other objects. The information stored about such prior objects may include make, model, manufacturer, type, age, purchase price, configuration, warranty status, and/or any other suitable information identifying the prior objects and their condition.

The virtual room, settlement amount, and list of recommended items may be used to generate a user interface for presentation to a user via display interface 227. User device 220 may include processor 223, memory 225, and display interface 227. User device 220 may be configured to interface with the virtual reality visualization device 210 to generate a display of the user interface. User device 220 may receive user input from the user selecting one or more recommended objects or other replacement objects for inclusion in the virtual room. This information may be provided to virtual reality visualization device 210 for generation of an updated display of the virtual room comprising the selected objects. Although FIG. 2 illustrates user device 220 as a separate device from virtual reality visualization device 210, it should be readily appreciated that the devices may be combined into a single device without departing from the disclosure herein. Further, display interface 227 may be connected to and/or integrated within user device 220 or virtual reality visualization device 210.

Figure 3:
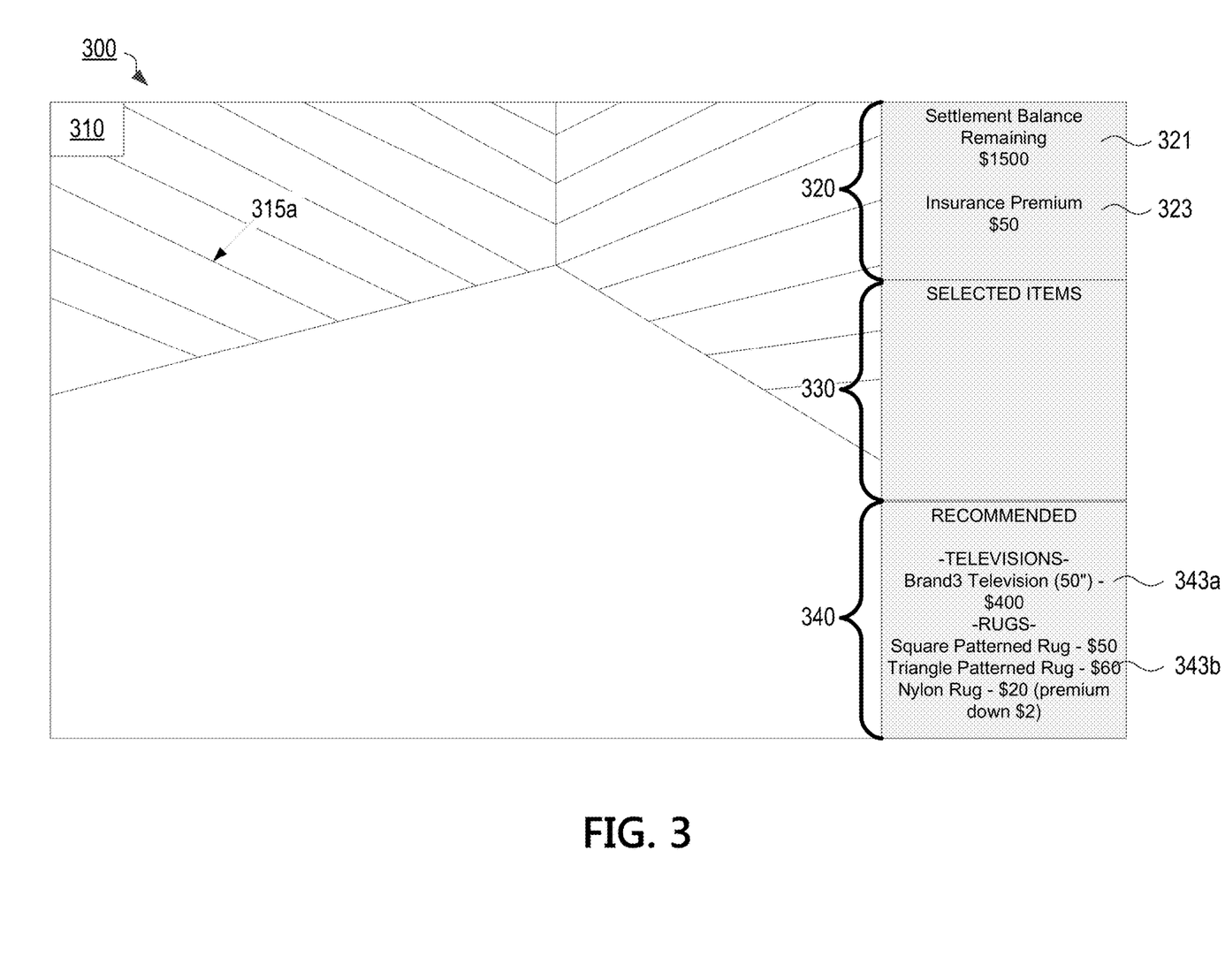
FIGS. 3 and 4 provide illustrative examples of graphical user interfaces according to one or more embodiments of the present disclosure.
Figure 4:
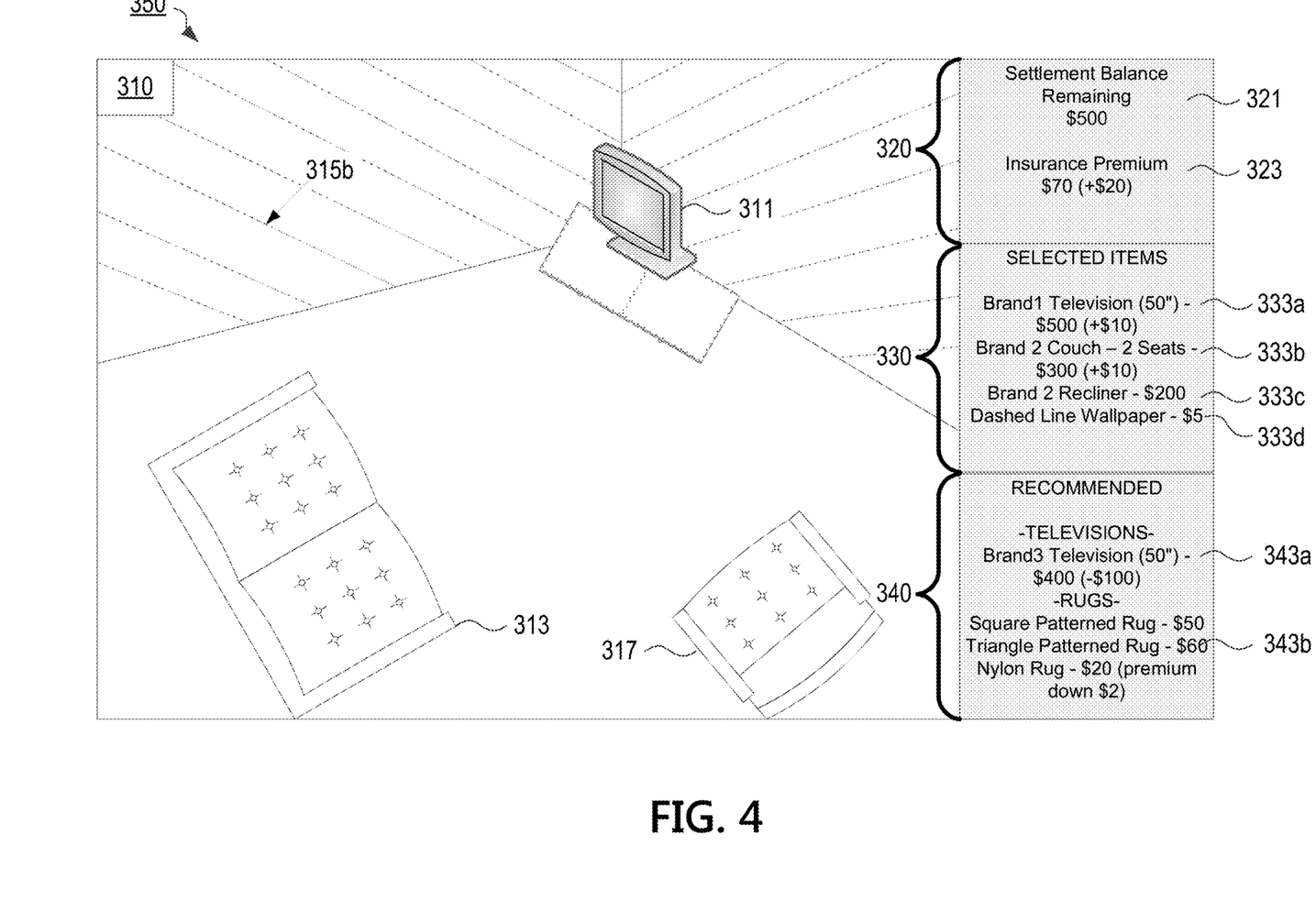

Having discussed an illustrative special purpose computer and operating environment in which one or more aspects described herein may be implemented, a detailed discussion of one or more aspects will proceed with respect to the sample user interfaces of FIGS. 3 and 4.

FIG. 3 illustrates a first example user interface 300 comprising a virtual representation of a real world room in the form of a virtual room 310. The user interface may comprise the virtual room 310, a settlement and premium section 320, a selected items list 330, and a list of recommended objects 340. The user interface may be generated by a virtual reality visualization device 210, a user device 220, and/or both in concert as part of the virtual reality visualization system 200. The generated user interface may be displayed to a user via display interface 227 or other display interface communicatively coupled to the virtual reality visualization system, for example.

In the example of FIG. 3, virtual room 310 is illustrated without any objects therein other than a wallcovering 315a. This may be, for example, due to a flood that damaged the objects in the room and reduced them to an unusable state. Insured users may submit claims for damage to objects in the room covered by a service, such as an insurance policy. Where the damage justifies replacing the object, the insurer may provide an appropriate settlement amount 321 to the insured covering costs associated with a replacement object and/or compensating the insured for their loss. The virtual reality visualization system may receive claim information including an identification of prior objects that occupied the real world room and were subject to damage or otherwise merit replacement and an associated settlement amount. For example, the real world room may have previously housed a two-seat couch made by Brand2, a 50" Brand2 television with stand, and a patterned rug. If each of these objects were damaged in the flood, the insured may submit a claim form listing each and seeking compensation and/or replacement of the damaged items, for example.

The virtual reality visualization system may generate a virtual room 310 based on information about a corresponding real world room and cause the virtual room 310 to be displayed on a display interface. The information about the real world room may include, for example, dimensions, location, objects therein, and/or other attributes of the real world room. The information about the real world room may also include information about items remaining in the room that are not part of the settlement and/or claims process. The information may include physical dimensions of the room, possibly including physical dimensions of other permanent objects in the room and the relative location of those objects. The information may also include the location of electrical outlets, plumbing, and/or ventilation that may contribute to where replacement items may be placed. The virtual room 310 may be a three-dimensional representation of the real world. Use of a three-dimensional virtual model may provide the user with an immersive experience as well as enable them to better visualize how the real world room may look with new objects installed.

The system may gather visual and/or sensory information from the real world room using cameras and other sensors and determine the attributes of the room based on the gathered information. For example, the system may determine a set of physical dimensions or identify outlets and other features of the room based on image data captured by a camera of a user device.

The virtual reality visualization system may populate the virtual room with one or more objects known to the system to occupy the real world room or other features of the real world room. In some embodiments, a user may report the identity of objects located in the real world room and features thereof. In other embodiments, the system may automatically detect the presence and identity of objects and features in the real world room based on visual and/or sensory information captured using cameras and other sensors. Some examples of objects that the virtual reality system may present in the virtual room include furniture, appliances, decorations, fixtures, floor and wall coverings, textures, and other objects. Information about the prior objects that occupied the real world room may be stored in a digital locker based on information reported by the insured user or based on information determined from an analysis of the captured visual and/or sensory information.

The virtual reality visualization system may allow users to select replacement objects from a catalog of objects and present a representation of selected objects in virtual room 310. A complete catalog of objects available to the user may be displayed on user interface 300 (not shown). The catalog may be indexed and categorized in order to facilitate location of desired objects.

According to some aspects, the system may recommend replacement objects based on the prior objects and/or based on attributes of the user and associated insurance policies (such as those attributes stored in the appliance information database). In some embodiments, the system may determine whether the prior objects are available to the system and may include available prior objects in a list of recommended replacement objects 340. For example, the Brand2 two-seat couch may be available from a supported retailer and therefore may be included in the recommended list 320. The system may select comparable replacement objects to prior objects that are determined to be unavailable. For example, the Brand2 television may be unavailable from supported retailers. The system may identify that Brand3 televisions are a suitable alternative to those of Brand2 and may include a Brand3 television in the recommended list at 343*a*.

In some embodiments, the system may recommend comparable alternative objects based on attributes of the prior objects, such as those stored in an appliance information database. The list of recommended replacement objects 340 may be presented to the user on user interface 300 via the display interface to facilitate selection of replacement objects for inclusion in the virtual room. The identification of alternative items may be accomplished based on attribute information associated with the prior objects and candidate replacement/alternative objects. Certain attributes may be tagged by the system as relevant to a determination whether two objects are suitable alternatives. For example, the system may determine that square patterned rugs and triangle patterned rugs have similar geometric design motifs as a prior rug of the real world room, and may include square and triangle patterned rugs in the recommended list 340 at 343*b*.

In other embodiments, the system may select alternative objects for inclusion in the list of recommended objects 340 based on determining an impact that object may have on a premium for an insurance policy associated with the user. For example, the system may identify that a nylon rug would cause an insurance premium decrease if added to the room. Based on the decrease in insurance premium and a similarity between the nylon rug and the existing rug, the system may determine to add the nylon rug to the list of recommended objects 340.

In some implementations, the system may generate recommendations for replacement objects based on information about the room. The recommended replacement objects may be selected based on the attributes of the room, including the dimensions of the room, the location of the room in the house, the number and/or location of windows in the room, the number and/or location of outlets in the room, the orientation of the room and/or room features, and the like. For example, the system may determine that a first television is preferable to another based on the amount of ambient light expected in a room with several windows.

In some embodiments, the system may further facilitate the user's review and selection of replacement objects by providing an indication of the impact the object may have on an insurance policy associated with the user, such as through insurance premium indication 323. According to some aspects, the system may determine a change in premium associated with a replacement object based on attributes of the replacement object (such as the nylon rug discussed above). The attributes may be determined based on information stored in an appliance information database. For example, the appliance information database may store safety ratings and other information relevant to assessing insurance risk associated with one or more replacement objects. In some implementations, the change in premium may be calculated based on a premium amount associated with a corresponding prior object. For example, a user may select a high-end oven to replace a damaged oven of lower quality, and the system may indicate that an insurance premium 323 would be raised to cover the increased value of objects in the room. Similarly, the system may indicate that replacement objects that are deemed safer and/or more dependable may reduce an insurance premium 323. The system may select alternative objects for inclusion in the list of recommended objects 340 based on the prior objects in the room and a determined change in premium associated with the alternative object.

The virtual reality visualization system may receive user input from the user selecting one or more replacement objects, such as a recommended replacement object from the list of recommendations 340. The system may update the virtual room 310 to include a virtual representation of the selected objects. The system may also update settlement and premium section 320, selected item section 330, and recommended objects list 340 based on the selection.

FIG. 4 illustrates a second example user interface 350 that may be generated after the user has selected several objects from user interface 300 of FIG. 3. User interface 350 has been updated to include an indication of selected objects 333*a-d* in selected items list 330 and representations of the selected objects 311, 313, 315*b*, and 317 in virtual room 310. User interface 350 has also been updated to reflect the remaining settlement balance 321 and changed insurance premium 323. In the example of FIG. 4, the user has selected a Brand1 television 330*a* to replace his prior Brand2 television. The user has also selected the same couch that he previously owned, the Brand2 two-seat couch 333*b*. The user also decided to add a Brand2 recliner 333*c* to the room. Finally, the user decided to change wallpaper 315*a* to dashed line wallpaper 333*d*. Responsive to these selections, the system added virtual representations 311, 313, 315*b*, and 317 to virtual room 310.

The system may receive user input indicating a location for the replacement object, and the object may be displayed as located at that position. The system may also utilize known location information associated with prior objects of the room to generate a recommended location for a corresponding replacement object. The system may utilize the known dimensions of the room and the specified location to determine whether the replacement object would fit at the specified location. The determination of whether the replacement object would fit may be further informed by the dimensions of the corresponding prior object. For example, the prior object information may indicate that the user's former Brand2 television was located in a corner of the real world room. Thus, when the user selects the Brand1 television, the system may automatically place representation 311 in the same location formerly occupied by the old television. The system may determine from attribute information stored in an appliance information database that the Brand2 television was 45"×30"×5" and may use this information to determine if the replacement television would fit in the space formerly occupied by the Brand2 television. Once placed in the virtual room 310, object representations (e.g., 311, 313, 317) may be individually manipulated to, for example, change a location or orientation of the virtual representation. For example, the user may use a mouse, touchscreen, or other user input device to select a virtual representation and move it to a new location.

The system may also recommend that the user purchase new items unrelated to the prior objects listed in the claim form or otherwise reported to the system. These new items may be recommended based on improving safety in the user's home and may potentially lead to lower insurance premiums. For example, the system may determine that the user does not have a smoke detector in the room and may recommend that the user purchase one with the settlement. The system may indicate a corresponding premium decrease associated with buying the new item. The system may also provide reminders and suggestions regarding maintenance and replacement of objects in the room. For example, the system may determine when an appliance was purchased and compare it to a useful life of the appliance. Based on this determination, the system may recommend replacement of the appliance. Similarly, the system may detect that a replaceable part, such as a water filter, likely needs replacement based on stored records regarding maintenance of the appliance and/or past purchase records and may provide a suitable recommendation.

The user may continue selecting objects and the system may continue updating the virtual room 310 until the user is satisfied with the state of the virtual room 310 and the object representations (e.g., 311, 313, 315*b*, 317) therein. Thus, users may be able to virtually rebuild a room in the event of damage and may be provided with a visualization of how the real world room may look after installation of the selected replacement objects.

The system may facilitate the purchase of the replacement objects by placing an order with a third-party for the replacement objects and may apply the balance of the settlement amount towards the purchase. Replacement objects may have an associated price, and the system may dynamically update the remaining settlement amount 321 as the user selects and/or removes replacement objects. In some embodiments, if the user selects replacement items having a value greater than the remaining settlement amount, the user may be allowed to pay the difference in cost between the selected items and the settlement amount. In some embodiments, the user may be required to pay a deductible amount as specified in an applicable insurance policy.

In some embodiments, the settlement amount may be divided into one or more categories and the system may update the settlement amount for a respective category associated with a selected object. Categories may be room based, such as allocating a certain percentage of the settlement to replacing items in the kitchen, with a second percentage possibly allocated to replacing items in the living room. Alternatively or additionally, categories may relate to the type of item, such as appliances, cabinetry, lighting, plumbing, countertops, and flooring, among other categories. For example, the settlement could be divided into a first portion for the kitchen category and a second portion for a bathroom category. When a replacement item is selected for inclusion in the virtual room, its price may be removed from the portion of the settlement amount associated with a settlement category corresponding to a category of the replacement item.

Once the user is satisfied with the state of the virtual room and the selected replacement objects, the system may generate and transmit an order for the selected replacement objects.

Having discussed many aspects of the disclosure with reference to the illustrative user interfaces shown in FIGS. 3 and 4, discussion will now turn to an illustrative method according to one or more aspects described herein.

Figure 5:
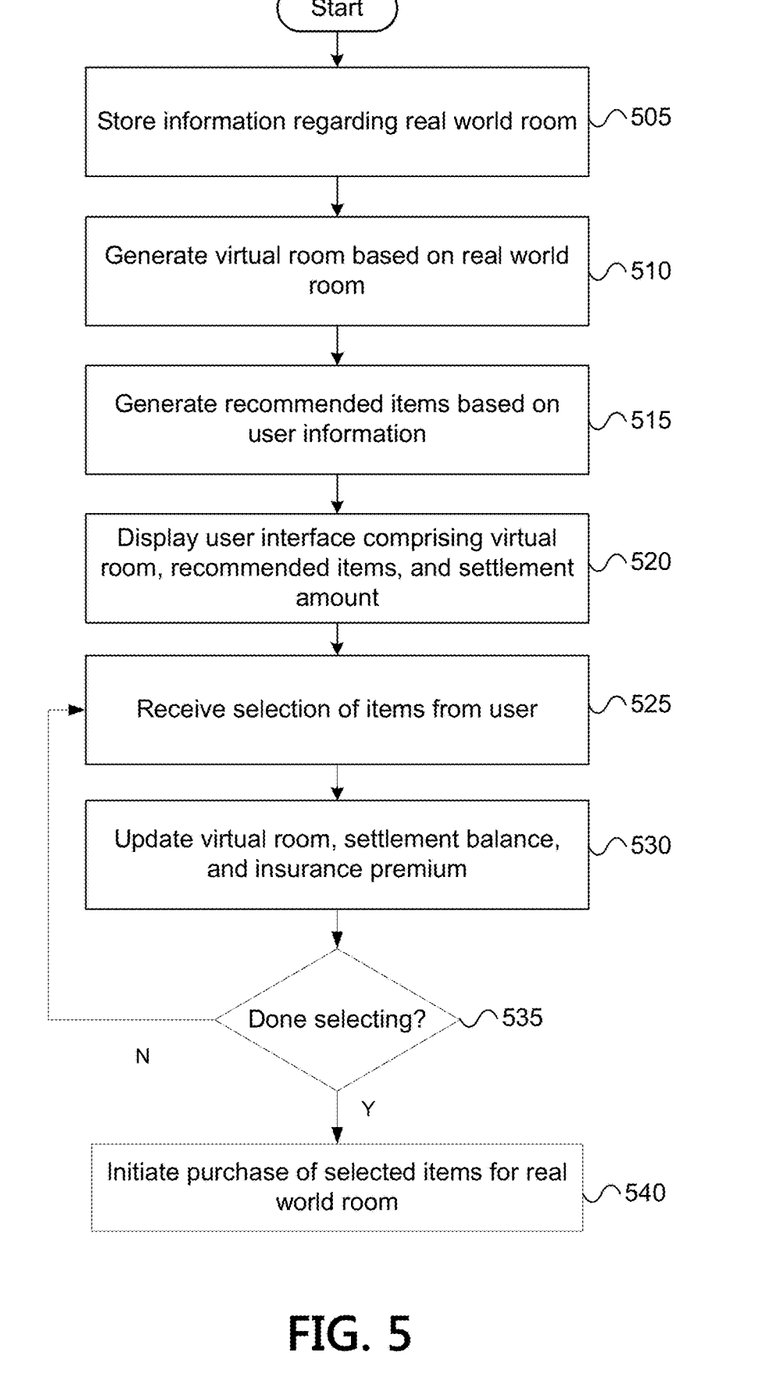
FIG. 5 provides an illustrative method for providing a virtual reality room building system with a recommendation engine in accordance with certain aspects of the disclosure.

FIG. 5 illustrates an example method of generating a virtual reality visualization for facilitating the selection and purchase of replacement objects as part of a claims process. The method illustrated in FIG. 5 may be performed by a special-purpose computing device, such as virtual reality visualization device 101. The methods may be performed by and or embodied in virtual reality visualization system 200, virtual reality realization device 210, user device 220, and/or any other suitable combination thereof. Although discussed briefly here, it is to be understood that the varied features discussed above with respect to FIGS. 3 and 4 may be incorporated in the method illustrated in FIG. 5 as appropriate.

At step 505, the virtual reality visualization system (and/or device) may store room information regarding a real world room. As described above, such room information may comprise physical dimensions of the room and other information describing one or more features of the room (such as the location of outlets). The system may store information regarding one or more objects in the real room and their locations. The system may also store information regarding one or more past objects reported or determined to have occupied the room. These past objects may be the subject of a submitted insurance claim and the system may facilitate the selection and purchase of replacement objects corresponding to the past objects. The system may provide automatic scanning features operative to analyze visual and/or sensory data captured in the real world room. For example, the system may capture a 360 degree scan (including, potentially, horizontal and vertical to capture the whole room) of the room and detect the presence and identity of objects therein. The system may conduct the detection of objects prior to an insured event to facilitate later replacement in the event of damage.

The system may also store information about the user and/or an associated insurance policy. For example, the system may store and/or determine a settlement amount associated with a claim submitted by the user. The system may store information about the insurance policy, such as a list of covered items, a premium amount, a deductible amount, exclusions, and/or any other suitable information. The room, object, user, and policy information may be stored in a room information database, a user information database, and/or an appliance information database.

At step 510, the system may generate a virtual room based on the room information associated with the real world room. The virtual room may be generated to be a virtual representation appearing similar to the real world room. Information about the objects in the room and other features (such as outlets, fixtures, windows, etc.) may be utilized to improve the accuracy of the virtual room. Image data captured by a user device may be utilized to select and/or generate suitable textures and other visual features. For example, an image of the real world room may be used by the system to determine a suitable texture to apply to walls of the virtual room (e.g. simulated paint textures and colors).

The virtual room may be populated using objects reported by the user or determined by the device to occupy the real world room. For example, if a fire damaged some objects in the room but left others intact, those remaining objects may be pre-placed in the virtual room. Damaged items subject to the claim process may be omitted from the virtual room, in some embodiments. In other embodiments, the system may populate the virtual room with each object detected as residing in the room and the user may be able to tag the damaged objects. In this manner, the user may be allowed to dynamically generate a list of damaged objects for submission as part of an insurance claims. Sensory and image information gathered by the system may be utilized to facilitate the calculation of a settlement amount for an insurance claim, in some embodiments. For example, the image data may be analyzed to determine the extent of damage to some objects and/or determine the condition of objects for replacement.

At step 515, the system may generate recommended items based on the user information. For example, the system may generate a list of recommended objects based on information about the prior objects that were damaged in the room. The recommended objects may be based on objects reported as damaged as part of a claims process. The list may also be based on objects that were reported as residing in a room, where the room was subject to an insured event that resulted in damage to objects therein (e.g. a fire or flood).

In some embodiments, the list of recommended objects may be determined based on the availability of the reported prior objects. The system may determine whether the prior objects are available to the system, such as whether the prior objects are sold by supported retailers. If the same prior object or similar object (such as a newer model) are available, the prior object and/or similar object may be included in the list of recommended objects. If the prior object is not available to the system, the system may determine one or more suitable replacement objects and include those replacement objects in the list of recommended objects. The system may determine suitable replacement objects based on one or more attributes associated with the prior object and the replacement objects. For example, the real room may have previously contained a Brand2 50" television. However, Brand2 may have gone out of business. The system may determine that Brand3 50" televisions are of a similar price and quality range to the Brand2 televisions and add a Brand3 50" television to the list of recommended objects.

In some implementations, the list of recommended objects may be determined based on related objects that may be an upgrade to existing objects. The system may recommend a range of replacement objects corresponding to a damaged prior object. The recommendations may be based on the user and policy information. For example, the system may determine that a large settlement is due to the user. The system may determine, in view of the settlement amount, that the user may be interested in replacing the damaged object with a higher-quality object of the same type, such as a nicer oven or television. The system may select recommended objects based on other user information, such as determining that a user with high income or who pays a high insurance premium may be interested in higher quality objects despite their higher cost.

According to some aspects, the list of recommended objects may be determined based on an expected or actual impact that the recommended object may have on an insurance premium of an insurance policy associated with the user. The system may assess safety and risk information associated with a given replacement object and determine a change in premium associated with that replacement object. The change in premium may be determined relative to a premium associated with the prior object, in some examples. The system may determine whether to include the replacement item in the list of recommended objects based on the amount of change in premium associated with the replacement item. The change in premium may be used as one factor in a multi-factor analysis of the replacement items. For example, the system may determine that a replacement item is of similar quality to the prior object but may have a higher safety rating and would result in a premium decrease. Thus, the replacement item may be included in the list of recommended items. Similarly, the system may determine that a replacement item would cause a slight premium increase but is of a greater quality than the prior object and may determine that the quality difference outweighs the premium increase.

At step 520, the system may generate and display (or cause to be displayed) a user interface comprising the virtual room, any objects therein, the list of recommended objects, and the settlement amount. The user interface may be displayed on a display interface such as display interface 227 of FIG. 2. The user interface may present a three dimensional view of the virtual room and the system may receive user input from the user to navigate within and interact with the virtual room.

At step 525, the system may receive user input indicating a selection of items by the user. The user input may select items from the recommended list of objects or from another list of objects, such as a full catalog of available objects. The user input may comprise a mouse click, touch, or other appropriate form of user input that indicates that the user has selected a particular object. The selected object may be added to a list of selected objects included on the user interface.

At steps 530, the system may update the virtual room to include a representation of the selected object. For example, if the user selects a particular couch as a replacement object, the system may update the virtual room to include a virtual representation of the couch. The representation may be placed in the room at a user-specified location. For example, upon receiving a selection of the replacement object, the system may prompt the user to select a location for the object such as by dragging the object to a desired location. The system may also automatically determine a location for the replacement object based on information about the prior objects. In particular, and for example, the system may determine a location of a prior object that corresponds to the replacement object and place the replacement object at the former location of the prior object. The system may determine whether the replacement object would fit in the room at the selected location, and may notify the user if the object does not fit. The updated virtual room may be displayed to the user via the user interface on the display interface.

The system may also update a settlement balance or amount based on a price associated with the selected replacement objects. The user may have been awarded a settlement amount for the purchase of replacement objects, and the system may dynamically update the settlement balance displayed on the user interface to inform the user of a remaining balance after selection of one or more replacement items. When the user has exhausted the settlement amount, the system may display a negative number or a user balance indicating an amount that the user would be required to pay beyond the settlement amount. The user interface may also include a display of a deductible associated with the user's insurance policy.

Similarly, the system may update an insurance premium based on the selected items. The user interface may include an indication of a current insurance premium and/or an indication of an expected change in insurance premium due to the selected items. As the user selects items for inclusion in the virtual room, the system may dynamically update the expected insurance premium and/or change in premium to inform the user of how the selected replacement objects may impact the user's insurance premiums.

The user interface may be updated to include the updated virtual room, objects therein, settlement amount and balance, insurance premium and/or change in premium, as appropriate.

At step 535, the system may determine whether the user is done selecting replacement objects. The user interface may include one or more controls (such as a button) that the user may operate to indicate that he is done selecting replacement objects. For example, the system may receive a mouse click and/or touchscreen tap on a finished button and may advance to step 540. If the user is not done selecting items, processing may return to step 525 where the user may continue to select items.

At step 540, the system may initiate purchase of the selected items for installation in the real world room. The system may generate an order for the items with one or more supported retailers to be delivered to the user. The system may apply the settlement amount towards the order. If any balance remains after application of the settlement amount, the user may be prompted for payment information and/or billed for the remainder. Similarly, if the user's insurance policy requires payment of a deductible, the user may be prompted for payment of the deductible.

Figure 6:
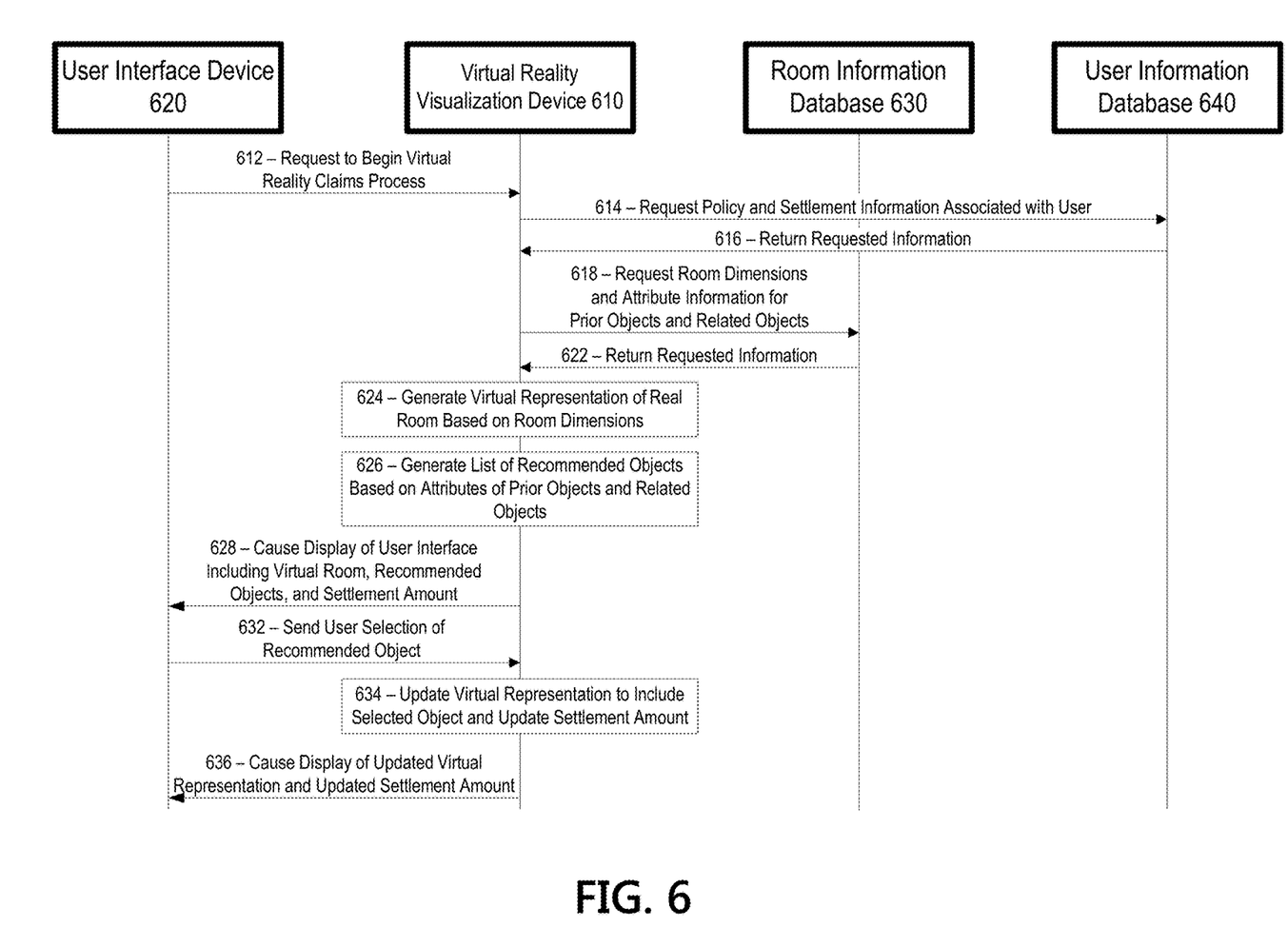
FIG. 6 provides an illustrative process flow of a virtual reality visualization system in accordance with certain aspects of the disclosure.

Having discussed an illustrative method of generating a virtual reality visualization to facilitate in the selection and purchase of replacement items as part of a claims process, discussion will now turn to an illustrative system and process flow as shown in FIG. 6.

FIG. 6 illustrates an example process flow according to one or more aspects described herein. A virtual reality visualization system may include a virtual reality visualization device 610, a user interface device 620, a room information database 630, and a user information database 640. As discussed above, the system may also include an appliance information database (not shown). Although illustrated separately, it should be understood that any of virtual reality visualization device 610, user interface device 620, room information database 630, and user information database 640 may be combined without departing from aspects described herein. In particular, the user interface device 620 may be integrated in virtual reality visualization device 610 in some embodiments.

Similar to virtual reality visualization device 210 described with reference to FIG. 2 above, virtual reality visualization device 610 may operate to generate a virtual room based on information about a real room based on information stored in room information database 630 and user information database 640. The virtual reality visualization device 610 may further generate a list of recommended objects for replacing objects in the real room. A user interface comprising the virtual room, a settlement amount, and the list of recommended objects may be generated and presented to a user via a user interface device 620. The user interface device 620 may receive user input selecting one or more objects for inclusion in the virtual room and the virtual reality visualization device 610 may generate an updated virtual room and settlement amount based on the selected objects.

In particular, at step 612 the user interface device 620 may issue a request to begin a virtual reality claims process. For example, a user of the user interface device 620 may launch a virtual claims application on the user interface device 620 and/or sign into a web page using a browser application. In some implementations, the virtual claims application may be an executable application downloaded to the user interface device 620 from an application store. The request may be sent to the virtual reality visualization device 610 to begin the virtual reality claims process. In some embodiments, the user interface device 620 is integrated with the virtual reality visualization device 610, and the request may be generated by the user interface portions of the integrated device to the virtual reality visualization portions of the integrated device.

At step 614, the virtual reality visualization device 610 may request policy and settlement information associated with a user. The policy and settlement information may be comprised in user information stored in user information database 640. At step 616, user information database 640 may return the policy and settlement information, as well as other information about the user, to the virtual reality visualization device 610.

At step 618, the virtual reality visualization device 610 may request room dimensions and prior object information from a room information database 630. In some embodiments, the virtual reality visualization device 610 may receive claims information comprising a list of prior objects and may request information about those objects. The prior object information may include one or more attributes associated with the prior objects stored in room information database 630. In other embodiments, the room information database 630 may store a list of prior objects associated with the room and the virtual reality visualization device 610 may retrieve the list from the room information database 630. The virtual reality visualization device 610 may also request information about related objects. Information about related objects may be stored in room information database 630 and/or stored in an appliance information database. The system may retrieve information regarding one or more objects deemed related to the prior objects reported to have occupied the real world room and/or objects reported to have been damaged in claims information. At step 622, the room information database 630 (and/or an appliance information database) may return the requested dimensions, prior objects, and object information.

At step 624, the virtual reality visualization device 610 may generate a virtual room. The virtual room may be a virtual representation of the real room and may be generated based on the physical dimensions of the room retrieved from the room information database 630. Information about the objects in the room and other features (such as outlets, fixtures, windows, etc.) may be utilized to improve the accuracy of the virtual room. Image data captured by a user device may be utilized to select and/or generate suitable textures and other visual features. For example, an image of the real world room may be used by the system to determine a suitable texture to apply to walls of the virtual room (e.g. simulated paint textures and colors). The virtual room may be populated using objects reported by the user or determined by the device to occupy the real world room.

At step 626, the system may generate a list of recommended objects based on attributes of the prior objects and related objects. For example, the system may generate a list of recommended objects based on information about the prior objects that were damaged in the room. The recommended objects may be based on objects reported as damaged as part of a claims process. In some embodiments, the list of recommended objects may be determined based on the availability of the reported prior objects. In some implementations, the list of recommended objects may be determined based on related objects that may be an upgrade to existing objects. According to some aspects, the list of recommended objects may be determined based on an expected or actual impact that the recommended object may have on an insurance premium of an insurance policy associated with the user.

At step 628, the system may generate and display (or cause to be displayed) a user interface comprising the virtual room, any objects therein, the list of recommended objects, and the settlement amount. The user interface may be displayed (or caused to be displayed) on a display interface of user interface device 620.

At step 632, the user interface device 620 may send an indication of a user selection of an object for inclusion in the virtual room responsive to user input indicating a selection of items by the user. The user input may select items from the recommended list of objects or from another list of objects, such as a full catalog of available objects. The user input may comprise a mouse click, touch, or other appropriate form of user input that indicates that the user has selected a particular object.

At step 634, the virtual reality visualization device 610 may update the virtual representation to include the selected object. In particular, the virtual room may be updated to include a representation of the selected object. The selected object may be added to a list of selected objects included on the user interface. The virtual reality visualization device 610 may update the settlement amount based on the price of the selected object. At step 636, the virtual reality visualization device 610 may cause display of the updated user interface by the user interface device 620. As described, the updated user interface may include the updated virtual room and the updated settlement amount.

Although embodiments described above generally utilized virtual reality visualizations of a real world room, in some embodiments the system may be implemented utilizing augmented reality techniques. While virtual reality systems may provide a user with a display of a virtual room corresponding to the real world room, augmented reality systems may generate displays of virtual objects and present them to a user such that the objects appear to occupy the real world room itself. For example, smart glasses may provide a user with an augmented reality experience by projecting virtual objects onto a field of vision of a user. These techniques may create the appearance that the virtual objects are present in a real world room or other real world environment. One of ordinary skill in the art will readily recognize that the many features described above in the context of virtual reality systems may also be implemented using these augmented reality techniques.

According to some embodiments, the system may use augmented reality techniques to display the virtual representations of selected objects such that they appear to the user to be placed in the real world room, similarly to the virtual reality embodiments described above. Instead of or in addition to displaying virtual representations in a virtual room, augmented reality techniques may present the virtual representations to the user as part of the real world room. The room visualization system and embodiments thereof described above in the context of virtual reality systems may utilize augmented reality techniques to provide similar functionality and information, but may overlay the virtual representations of objects onto the real-world room rather than display them in a virtual room.

Augmented reality may allow the system to provide a user with further flexibility in visualizing a room, such as by dynamically representing objects in the room (both existing/real objects and replacement/virtual objects) and allowing users to move the virtual objects within the real world room. By transforming existing/real objects into virtual representations, in some embodiments, the system may allow a user to visualize how the room may be arranged to accommodate replacement objects by moving an existing object to another location. For example, augmented reality system (and/or the virtual reality system discussed above) may allow a user to move an existing sofa to the other side of a real world room based on the addition of a virtual coffee table. This may allow the user to get the right fit for added furnishings.

Aspects of the disclosure have been described in terms of illustrative embodiments thereof. Numerous other embodiments, modifications and variations will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Additionally, those skilled in the art will appreciate that there are numerous variations and permutations of the above-described systems and techniques that fall within the spirit and scope of the invention as set forth in the appended claims.

What is claimed is:

1. A method comprising:
storing, by a first data source of a visualization device, room information corresponding to a real room, wherein the room information comprises dimensions of the real room and a prior object listing of one or more prior objects associated with the real room;
generating, by the visualization device, a replacement object listing comprising one or more replacement objects based at least in part on the prior object listing, wherein generating the replacement object listing based at least in part on the prior object listing comprises:
determining a change in premium for the one or more replacement objects; and
based on determining the change in premium for the one or more replacement objects, selecting at least one of the one or more replacement objects for the replacement object listing;

generating, by the visualization device, a user interface displayed to a user via a display interface and comprising the replacement object listing, wherein the user interface comprises:

a virtual reality user interface comprising a virtual representation of the real room, wherein a size of the virtual representation of the real room is based on the dimensions of the real room; or an augmented reality user interface dynamically overlaid on the user's live view of the real room based at least in part on the dimensions of the real room;

receiving, by the visualization device, a selection of a first replacement object of the replacement object listing from the user;

updating the user interface to include a virtual representation of the first replacement object overlaid on the virtual representation or the user's live view of the real room; and automatically generating an order to purchase the selected first replacement object in response to user input via the updated user interface.

2. The method of claim 1, further comprising:

receiving second user input comprising an indication of a location in the real room for the first replacement object, wherein updating the user interface to include a virtual representation of the first replacement object comprises placing the virtual representation of the first replacement object such that the virtual representation appears to be at the location in the user's live view of the real room or the virtual representation of the real room.

3. The method of claim 2, wherein generating the replacement object listing based at least in part on the prior object listing comprises:

determining whether a given replacement object fits in the real room at the location based on the dimensions of the real room.

4. The method of claim 1, wherein the information regarding prior objects associated with the user is determined based on image data associated with the real room.

5. The method of claim 1, wherein the prior object list is received from a digital locker database configured to store information regarding prior objects reported by the user.

6. The method of claim 1, wherein generating the replacement object listing based at least in part on the prior object listing comprises:

determining one or more replacement objects associated with a given prior object of the one or more prior objects;

for each of the one or more replacement objects, determining a change in premium for a service associated with the user based on attributes of a given replacement object relative to attributes of the given prior object; and selecting a recommended replacement object of the one or more replacement objects for inclusion in the replacement object listing based on the determined changes in premiums for the one or more replacement objects.

7. The method of claim 1, further comprising:

determining a change in a premium for a service associated with the user based on the selection of the first replacement object; and causing a display of the change in premium to the user.

8. A system comprising:

a display interface in communication with a visualization device, wherein the display interface is configured to present a graphical user interface dynamically overlaid on a user's live view of a real room or a virtual representation of the real room, wherein the graphical user interface comprises a replacement object listing comprising one or more replacement objects for inclusion in the real room; and the visualization device, wherein the visualization device comprises:

one or more processors;

a first data source configured to store room information corresponding to the real room, wherein the room information comprises dimensions of the real room and a prior object listing of one or more prior objects associated with the real room; and memory storing instructions that, when executed by the one or more processors, cause the visualization device to:

generate the user interface overlaid on the user's live view of the real room, or the virtual representation of the real room, based at least in part on the dimensions of the real room;

generate the replacement object listing comprising the one or more replacement objects based at least in part on the prior object listing, wherein generating the replacement object listing based at least in part on the prior object listing comprises:

determining a change in premium for the one or more replacement objects; and based on determining the change in premium for the one or more replacement objects, selecting at least one of the one or more replacement objects for the replacement object listing;

cause display of the user interface comprising the replacement object listing on the display interface;

receive first user input comprising a selection of a first replacement object of the replacement object listing from the user;

update the user interface to include a virtual representation of the first replacement object relative to the real room or the virtual representation of the real room;

cause display of the updated user interface on the display interface overlaid on the user's live view of the real room; and automatically generate an order to purchase the selected first replacement object in response to second user input via the updated user interface.

9. The system of claim 8, wherein the instructions further cause the visualization device to:

receive third user input comprising an indication of a location in the real room for the first replacement object, wherein the instructions cause the visualization device to update the user interface to include a virtual representation of the first replacement object by causing the visualization device to place the virtual representation of the first replacement object such that the virtual representation appears to be at the location in the user's live view of the real room or the virtual representation of the real room.

10. The system of claim 9, wherein the instructions cause the visualization device to generate the replacement object listing based at least in part on the prior object listing by causing the visualization device to:

determine whether a given replacement object fits in the real room at the location based on the dimensions of the real room.

11. The system of claim 8, wherein the information regarding prior objects associated with the user is determined based on image data associated with the real room.

12. The system of claim 8, wherein the first data source is a digital locker database configured to store information regarding prior objects reported by the user.

13. The system of claim 8, wherein the instructions cause the visualization device to generate the replacement object listing based at least in part on the prior object listing by causing the visualization device to:
   determine one or more replacement objects associated with a given prior object of the one or more prior objects;
   for each of the one or more replacement objects, determine a change in premium for a service associated with the user based on attributes of a given replacement object relative to attributes of the given prior object; and
   select a recommended replacement object of the one or more replacement objects for inclusion in the replacement object listing based on the determined changes in premiums for the one or more replacement objects.

14. The system of claim 8, wherein the instructions further cause the visualization device to:
   determine a change in a premium for a service associated with the user based on the selection of the first replacement object; and
   cause a display of the change in premium to the user.

15. A non-transitory computer-readable medium storing instructions that, when executed by one or more processors, cause a visualization device to perform steps comprising:
   storing, by a first data source of the visualization device, room information corresponding to a real room, wherein the room information comprises dimensions of the real room and a prior object listing of one or more prior objects associated with the real room;
   generating a replacement object listing comprising one or more replacement objects based at least in part on the prior object listing, wherein generating the replacement object listing based at least in part on the prior object listing comprises:
      determining a change in premium for the one or more replacement objects; and
      based on determining the change in premium for the one or more replacement objects, selecting at least one of the one or more replacement objects for the replacement object listing;
   generating a user interface displayed to a user via a display interface and comprising the replacement object listing, wherein the user interface comprises:
      a virtual reality user interface comprising a virtual representation of the real room, wherein a size of the virtual representation of the real room is based on the dimensions of the real room; or
      an augmented reality user interface dynamically overlaid on the user's live view of the real room based at least in part on the dimensions of the real room;
   receiving a selection of a first replacement object of the replacement object listing from the user;
   updating the user interface to include a virtual representation of the first replacement object overlaid on the virtual representation or the user's live view of the real room; and
   automatically generating an order to purchase the selected first replacement object in response to user input via the updated user interface.

16. The computer-readable medium of claim 15, wherein the instructions cause the visualization device to perform further steps comprising:
   receiving second user input comprising an indication of a location in the real room for the first replacement object, wherein updating the user interface to include a virtual representation of the first replacement object comprises placing the virtual representation of the first replacement object such that the virtual representation appears to be at the location in the user's live view of the real room or the virtual representation of the real room.

17. The computer-readable medium of claim 16, wherein generating the replacement object listing based at least in part on the prior object listing comprises:
   determining whether a given replacement object fits in the real room at the location based on the dimensions of the real room.

18. The computer-readable medium of claim 15, wherein the information regarding prior objects associated with the user is determined based on image data associated with the real room.

19. The computer-readable medium of claim 15, wherein the prior object list is received from a digital locker database configured to store information regarding prior objects reported by the user.

20. The computer-readable medium of claim 15, wherein generating the replacement object listing based at least in part on the prior object listing comprises:
   determining one or more replacement objects associated with a given prior object of the one or more prior objects;
   for each of the one or more replacement objects, determining a change in premium for a service associated with the user based on attributes of a given replacement object relative to attributes of the given prior object; and
   selecting a recommended replacement object of the one or more replacement objects for inclusion in the replacement object listing based on the determined changes in premiums for the one or more replacement objects.

* * * * *